(12) United States Patent
Coates et al.

(10) Patent No.: X548
(45) Date of Patent: Apr. 30, 1804

(54) STRAW CUTTER/MOWER

(76) Inventors: Moses Coates; Evan Evans

Moses Coates & Evan Evans.

Letters Patent: Dated April [illegible] 1804.

The Schedule referred to in these Letters Patent, and making part of the same, containing a Description in the words of the said Moses Coates and Evan Evans themselves, of their improved machine for cutting straw, hay, &c, &c.

The principle of our improvement consists in hanging the cutting knife by each end instead of one only to keep it steady in the operation of cutting. This is done by attaching each end to a separate Lath or connecting Rod, moving on center pins at each end of the knife, and also at each opposite end of the connecting Rods, similar to the moving Bar or [illegible] rod to which one end of the knife has usually been attached: also in varying the position of the knife to cut from instead of towards the operator, setting it at such an angle with the line of the straw, &c, which it is to cut, as to cause it to slide endwise at the same time that the edge progresses through the straw, which position requires the least force in the operation; and in attaching a sliding lever that can be lengthened to obtain the power required to move the knife; or our principle may be put in operation by attaching each end of the knife to a sliding gate at such an angle across the slided front of the Box that by sliding the gate up and down or otherwise with a vibrating motion, the compound motion of the knife will be produced so as to cut with the least force. The knife fixed in either of the above ways may be moved either by a fly wheel or crank, or a simple lever or handle, and this our Principle may be applied in various ways to all the different forms and constructions of cutting boxes now in use; and any of the various ways or methods of moving the straw &c. to the knife may be used as well as that we have explained.

Witnesses present,
Isaac Coates jun.
Caleb Coates.

Moses Coates,

Evan Evans.

(Recorded anew, Sep. 22, 185[illegible])